United States Patent
Yamaguchi

(10) Patent No.: US 12,472,649 B2
(45) Date of Patent: Nov. 18, 2025

(54) POWER HARNESS AND ROBOT

(71) Applicant: FANUC CORPORATION, Yamanashi (JP)

(72) Inventor: Ryou Yamaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 216 days.

(21) Appl. No.: 18/265,536

(22) PCT Filed: Dec. 14, 2021

(86) PCT No.: PCT/JP2021/045931
§ 371 (c)(1),
(2) Date: Jun. 6, 2023

(87) PCT Pub. No.: WO2022/131231
PCT Pub. Date: Jun. 23, 2022

(65) Prior Publication Data
US 2024/0116200 A1    Apr. 11, 2024

(30) Foreign Application Priority Data
Dec. 16, 2020 (JP) ................. 2020-208283

(51) Int. Cl.
*B25J 19/00* (2006.01)
*H01B 7/08* (2006.01)
*H02G 11/00* (2006.01)

(52) U.S. Cl.
CPC ................. *B25J 19/0029* (2013.01)

(58) Field of Classification Search
CPC ...... H01B 7/0823; H01B 7/08; H02G 11/006; H02G 11/00
See application file for complete search history.

(56) References Cited

U.S. PATENT DOCUMENTS 6,708,480 B1    3/2004   Wehler

FOREIGN PATENT DOCUMENTS

| JP | H05012803 U | 2/1993 |
| JP | 2003168326 A * | 6/2003 |
| JP | 2003244831 A | 8/2003 |
| JP | 2003533955 A | 11/2003 |
| JP | 2007015053 A | 1/2007 |

(Continued)

OTHER PUBLICATIONS

International Search Report dated Jan. 21, 2022, for International Patent Application No. PCT/JP2021/045931.

(Continued)

*Primary Examiner* — Timothy J Thompson
*Assistant Examiner* — Amol H Patel
(74) *Attorney, Agent, or Firm* — KARCESKI IP LAW, PLLC

(57) ABSTRACT

A power harness includes: a first connector connectable to a power supply; a second connector connectable to a power connector provided at a single actuator; and a connection cable that connects the first connector and the second connector to each other. At least a lengthwise section of the connection cable is a movable region constituted of a plurality of small-diameter cables arranged parallel to each other. A sum of allowable current values of all the small-diameter cables satisfies an allowable current value of the connection cable.

6 Claims, 7 Drawing Sheets

(56) References Cited

FOREIGN PATENT DOCUMENTS

| | | | |
|---|---|---|---|
| JP | 2008130491 A | | 6/2008 |
| JP | 2009179117 A | | 8/2009 |
| JP | 2014065110 A | | 4/2014 |
| JP | 2015039266 A | | 2/2015 |
| JP | 2016158427 A | * | 9/2016 |
| JP | 2019071747 A | | 5/2019 |
| JP | 2020036450 A | | 3/2020 |
| JP | 2020053124 A | | 4/2020 |
| JP | 2020108987 A | | 7/2020 |

OTHER PUBLICATIONS

Japanese Office Action dated Sep. 17, 2024, for Japanese Patent Application No. 2022-569997.

* cited by examiner

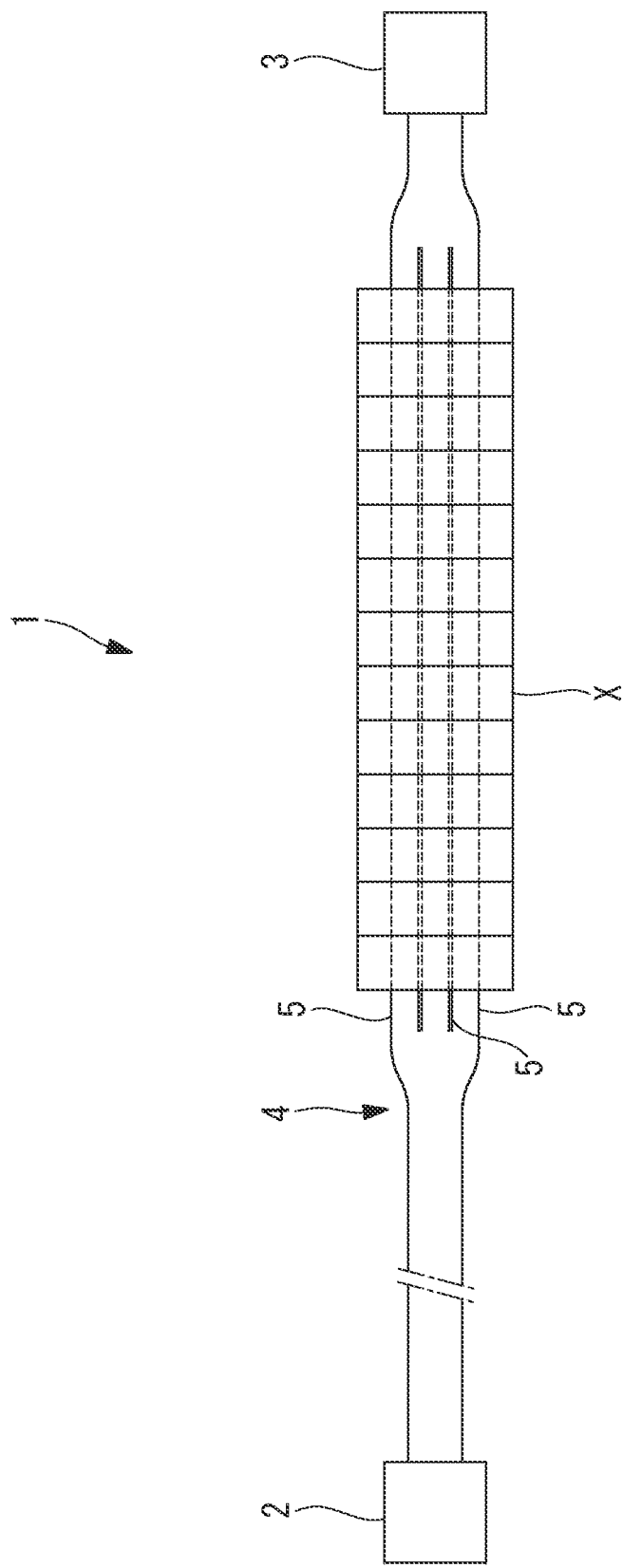

POWER HARNESS AND ROBOT

CROSS-REFERENCE TO RELATED APPLICATION(S)

This is a National Stage Entry into the United States Patent and Trademark Office from International Patent Application No. PCT/JP2021/045931, filed on Dec. 14, 2021, which relies on and claims priority to Japanese Patent Application No. 2020-208283, filed on Dec. 16, 2020, the contents of both of which are incorporated herein by reference.

FIELD OF THE INVENTION

The present disclosure relates to power harnesses and robots.

BACKGROUND OF THE INVENTION

A known harness equipped with a plurality of cables routed through a movable part, such as a sliding door, of an automobile is provided with a flat section having a flat shape by arranging the cables parallel to each other. The harness is moved, bent, or routed through a flat space by utilizing the thinness and the bendability of the flat section (e.g., see Japanese Unexamined Patent Application, Publication No. 2009-179117).

SUMMARY OF THE INVENTION

An aspect of the present disclosure is directed to a power harness including: a first connector connectable to a power supply; a second connector connectable to a power connector provided at a single actuator; and a connection cable that connects the first connector and the second connector to each other. At least a lengthwise section of the connection cable is a movable region constituted of a plurality of small-diameter cables arranged parallel to each other. A sum of allowable current values of all the small-diameter cables satisfies an allowable current value of the connection cable.

BRIEF DESCRIPTION OF THE DRAWINGS

FIG. 7 is a front view illustrating a modification of the power harness in FIG. 2.

DESCRIPTION OF EMBODIMENT(S) OF THE INVENTION

A power harness 1 and a robot 100 according to an embodiment of the present disclosure will be described below with reference to the drawings.

Figure 1:
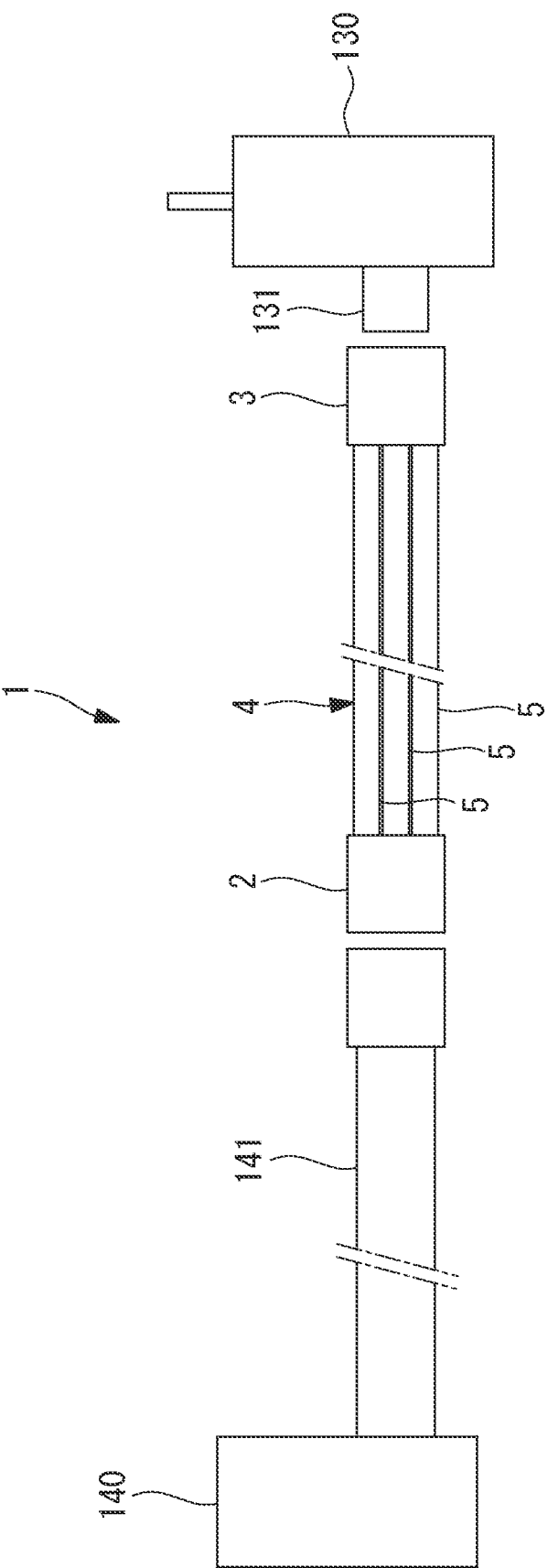
FIG. 1 is a front view illustrating a connection example of a power harness according to an embodiment of the present disclosure.

As shown in FIG. 1, for example, the power harness 1 according to this embodiment is used in a robot 100 having a rectilinear mechanism and includes a single first connector 2, a single second connector 3, and a connection cable 4 that connects the first connector 2 and the second connector 3 to each other.

The first connector 2 is fixed to a distribution board 111a provided at a base 111 of the robot 100 and is electrically connectable to a power supply by being connected to a power supply cable 141 extending from an externally-disposed power supply 140. The second connector 3 is connectable to a power connector 131 of a motor (actuator) 130 provided in a mechanical unit 120 that is moved by a rectilinear mechanism 110.

The connection cable 4 includes a plurality of (e.g., three) small-diameter cables 5 arranged parallel to one another. The small-diameter cables 5 have substantially the same outer diameter. The sum of allowable current values of the small-diameter cables 5 is greater than or equal to an allowable current value required in a single cable when the first connector 2 and the second connector 3 are connected to each other by such a cable.

The robot 100 equipped with the power harness 1 according to this embodiment will now be described.

Figure 3:
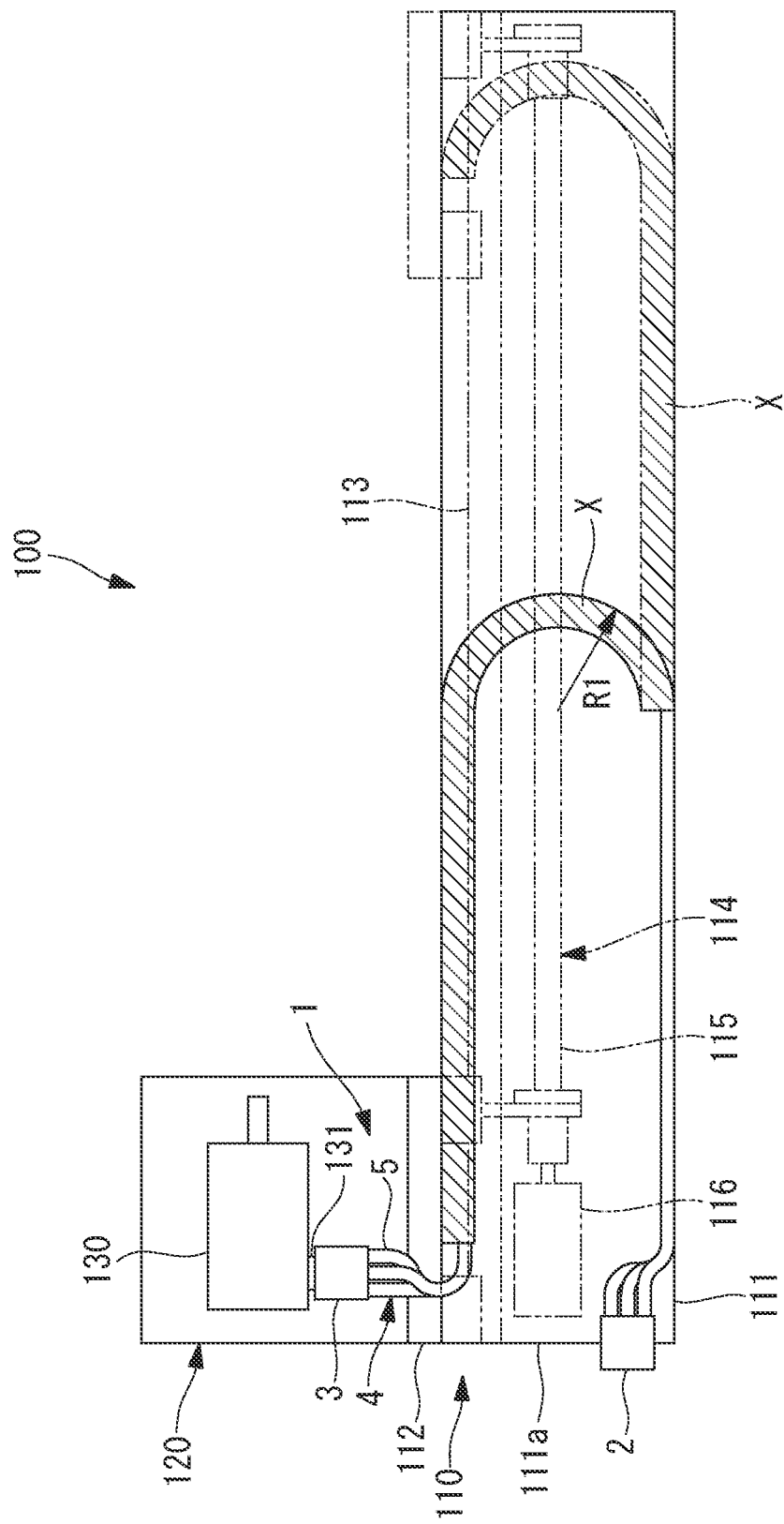
FIG. 3 schematically illustrates an example of a robot according to an embodiment of the present disclosure.

As shown in FIG. 3, the robot 100 includes the rectilinear mechanism 110 and a mechanical unit 120 that has at least one axis and that is to be rectilinearly moved by the rectilinear mechanism 110. The mechanical unit 120 includes the motor 130 fixed to a slider 112.

As shown in FIG. 3, the rectilinear mechanism 110 includes the base 111, the slider 112 equipped with the mechanical unit 120, a guide rail 113 that supports the slider 112 relative to the base 111 in such a manner as to be rectilinearly movable in one direction, and a driving-force converting mechanism 114 that is driven by a motor 116 so as to rectilinearly move the slider 112. The driving-force converting mechanism 114 converts a rotational motion of the motor 116 for, for example, a ball screw 115 (or a rack-and-pinion) into a rectilinear motion.

Figure 2:
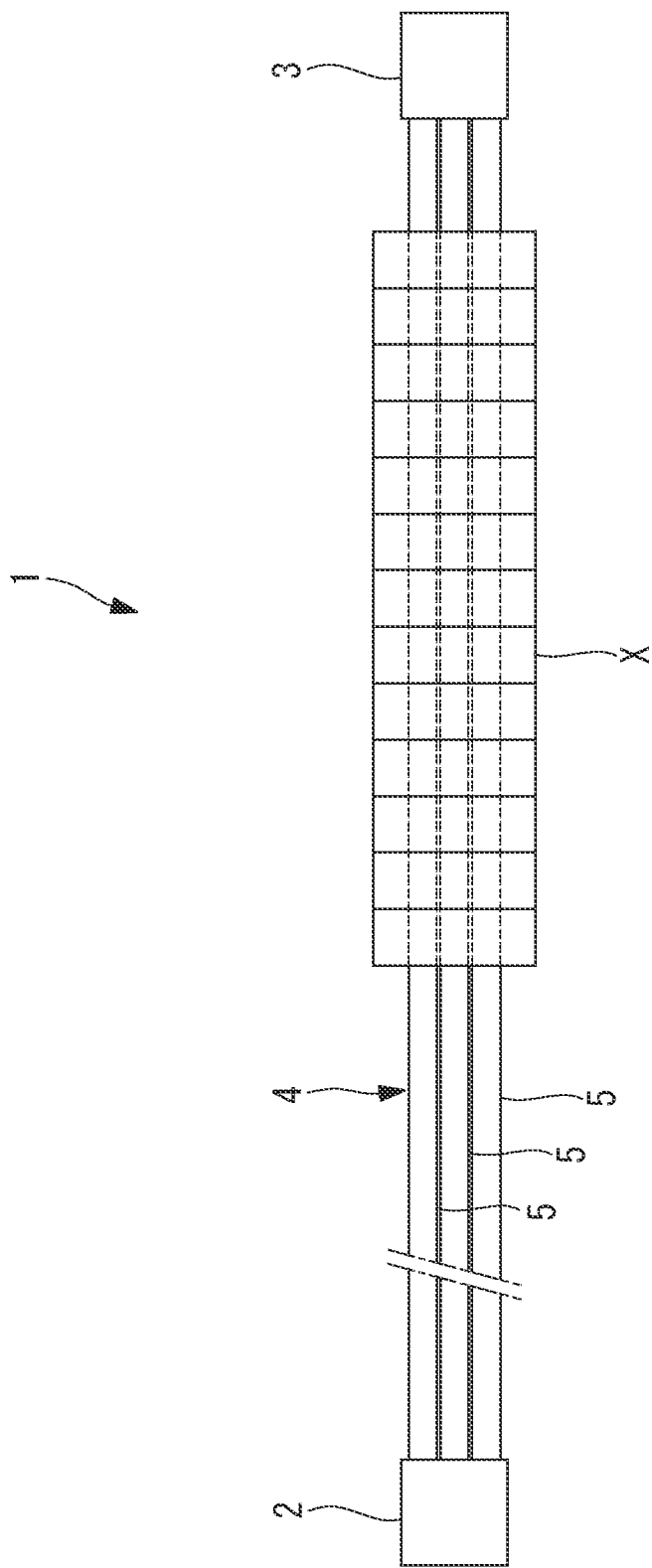
FIG. 2 is a front view illustrating a state where a carrier is attached to the power harness in FIG. 1.

As shown in FIG. 2, the power harness 1 according to this embodiment has a carrier X attached to a lengthwise section of the connection cable 4. As shown in FIG. 3, in order to attach the power harness 1 according to this embodiment to the rectilinear mechanism 110, the first connector 2 is fixed to the distribution board 111a of the base 111, and the second connector 3 is connected to the power connector 131 of the motor 130 in the mechanical unit 120. Furthermore, one end of the carrier X is fixed to the base 111, and the other end of the carrier X is fixed to the slider 112.

For example, the carrier X is formed into a bendable chain-like shape by attaching a plurality of hollow frames to each other in such a manner as to be rotatable around axes parallel to each other. The carrier X has an internal space through which the connection cable 4 is extendable, and accommodates the lengthwise section of the connection cable 4 in the internal space, so as to be capable of guiding the movement of the connection cable 4 within the accommodated region (movable region).

In the example shown in FIG. 3, the carrier X is bent in a U-shape and is disposed between the base 111 and the slider 112. When the slider 112 is rectilinearly moved relative to the base 111, the carrier X rectilinearly moves the other end fixed to the slider 112 while changing the bent position. Accordingly, the small-diameter cables 5 in the movable region accommodated in the internal space are deformed while being guided by the carrier X.

Then, the power supply cable 141 connected to the power supply 140 is connected to the first connector 2 fixed to the distribution board 111*a*, whereby the electric power from the power supply 140 is supplied via the power harness 1 to the motor 130 of the mechanical unit 120 equipped in the slider 112. Accordingly, the mechanical unit 120 can be actuated at each position of the slider 112.

Figure 4:
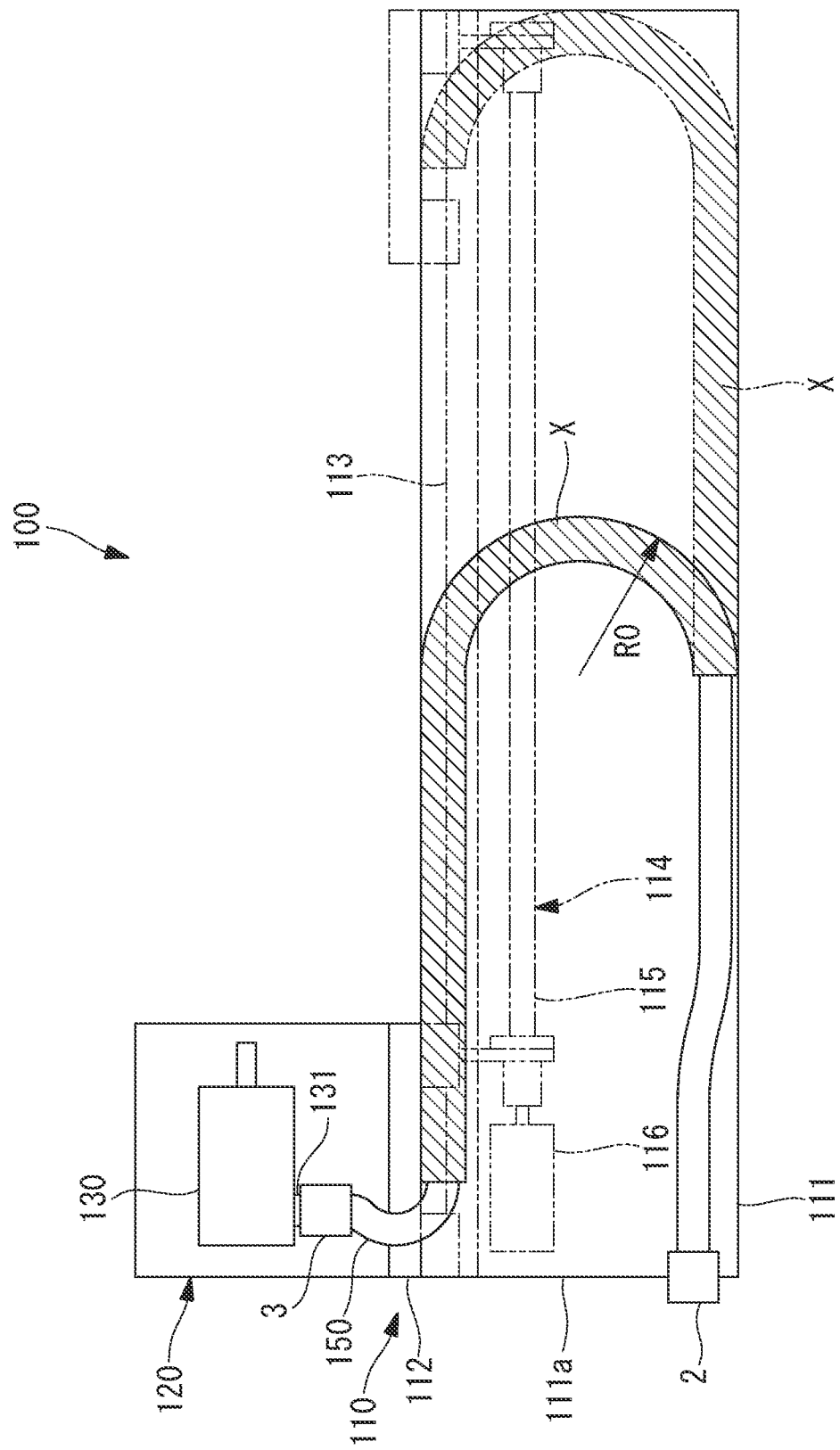
FIG. 4 illustrates a reference example where a power harness is a single connection cable.

With the power harness 1 according to this embodiment, the electric power supplied to the first connector 2 is distributively transmitted through the three small-diameter cables 5 and is supplied to the motor 130 of the mechanical unit 120 via the second connector 3. In particular, the connection cable 4 is constituted of the three small-diameter cables 5 so that a bending radius R1 of the carrier X can be sufficiently reduced, as compared with a bending radius R0 shown in FIG. 4 in which a single connection cable 150 having three cables' worth of allowable current value is used. This is advantageous in that the space that the carrier X occupies inside the rectilinear mechanism 110 can be reduced and the rectilinear mechanism 110 can be reduced in size.

Figure 5:
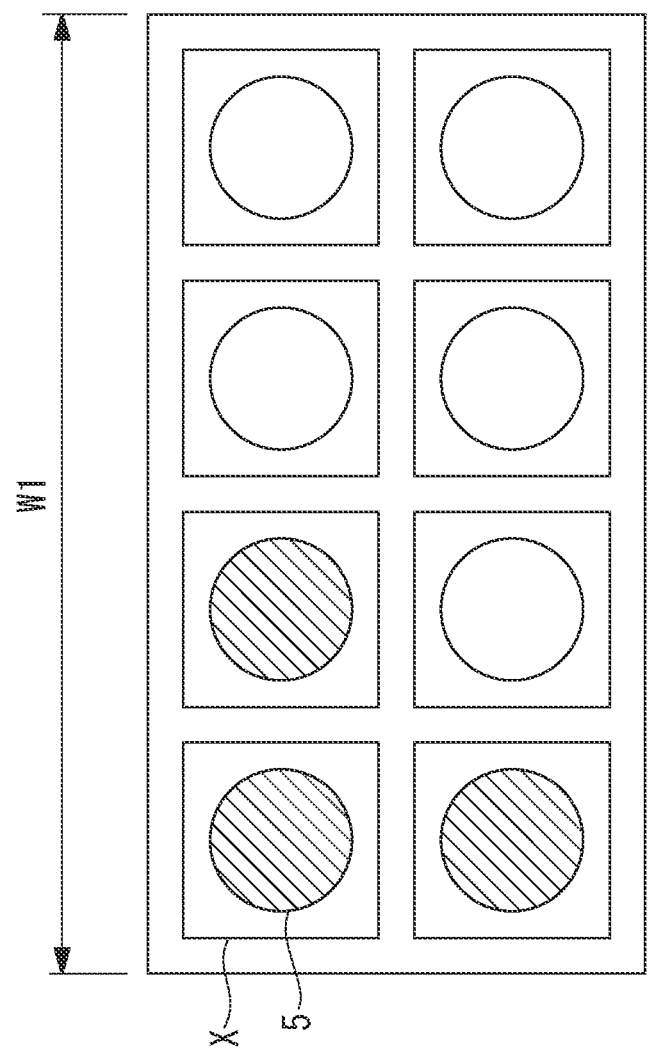
FIG. 5 is a cross-sectional view illustrating an example of the arrangement of small-diameter cables in an internal space of the carrier in FIG. 2.

Furthermore, in the power harness 1 according to this embodiment, the first connector 2 and the second connector 3 that are originally connected to each other by a single cable are connected by the three small-diameter cables 5, so that the outer diameter of each cable is reduced. Accordingly, as shown in FIG. 5, when the internal space in the carrier X is divided into a plurality of small spaces by partitions, the small spaces through which the respective small-diameter cables 5 (indicated as hatched areas in the drawing) extend can be reduced in size.

The carrier X accommodates therein, for example, the small-diameter cables 5 or tubes connected to, for example, the motor 130 for another axis of the mechanical unit 120, in addition to the power harness 1 that requires large electric current. With the power harness 1 according to this embodiment, the plurality of small-diameter cables 5 are used in place of a single cable, so that the small spaces in the carrier X accommodating the small-diameter cables 5 can be made closer in size to small spaces that accommodate, for example, other cables.

Figure 6:
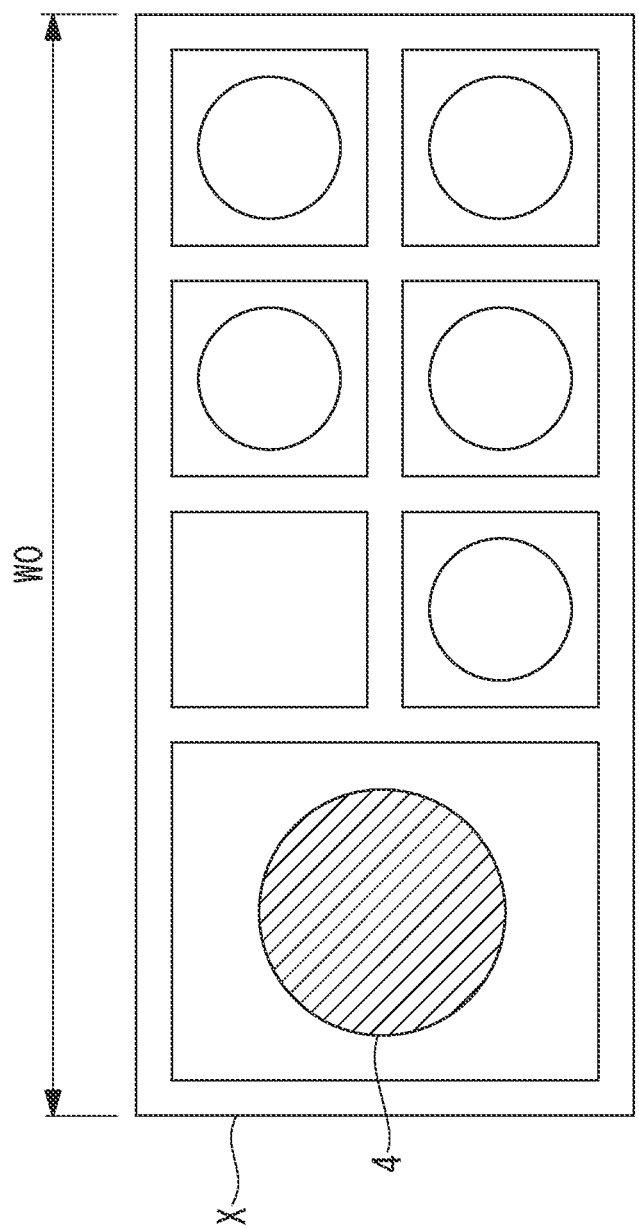
FIG. 6 illustrates a reference example of an internal space of a carrier in the case of FIG. 4.

Accordingly, for example, the internal space in the carrier X can be used efficiently so that a width W1 may be reducible, as compared with a width W0 of the carrier X shown in FIG. 6 in which the connection cable 4 (indicated as a hatched area in the drawing) is formed of a single cable.

Furthermore, the outer diameter of the small-diameter cables 5 is made closer to the outer diameter of other cables, so that all the cables can have about the same lifespan after being repeatedly bent. This is advantageous in terms of less maintenance and lower cost.

In this embodiment, the first connector 2 and the second connector 3 of the power harness 1 are connected to each other by the three small-diameter cables 5 over the entire length. Alternatively, as shown in FIG. 7, only the section accommodated in the carrier X may be constituted of the three small-diameter cables 5, whereas the remaining sections may be constituted of a single cable obtained by binding together the three small-diameter cables 5.

Accordingly, with regard to the movable region constituted of the plurality of small-diameter cables 5, the bending radius can be reduced, and the rectilinear mechanism 110 can be reduced in size. The region where the cables are bound together into a single cable is advantageous in terms of enhanced ease of handling.

In this embodiment, the power harness 1 may include the connection cable 4 and the carrier X attached to the connection cable 4. In this case, the number of multiple small spaces having the same size and formed by dividing the internal space of the carrier X by partitions is preferably larger than the number of small-diameter cables 5. Other cables or tubes with the same outer diameter as the small-diameter cables 5 can extend through small spaces other than the small spaces through which the small-diameter cables 5 extend.

The robot 100 according to the embodiment described above has the rectilinear mechanism 110. Alternatively, the robot 100 may include a first member and a second member that are supported in such a manner as to be relatively movable, and also include the power harness 1. One end of the carrier X may be fixed to the first member, and the other end of the carrier X may be fixed to the second member. Specifically, in the robot 100, the first member and the second member are not limited to being rectilinearly movable, and may be relatively rotatable.

The invention claimed is:

1. A power harness comprising:
a first connector connectable to a power supply;
a second connector connectable to a power connector provided at a single actuator;
a connection cable in which at least a lengthwise section is a movable region constituted of a plurality of small-diameter cables arranged parallel to each other, the connection cable connecting the first connector and the second connector to each other; and
a carrier that surrounds at least a part of the movable region and that guides movement of the movable region,
wherein an internal space of the carrier is divided into a plurality of small spaces through which the small-diameter cables extend in a lengthwise direction of the carrier, the plurality of small spaces have identical sizes, and a number of the small spaces is larger than a number of the small-diameter cables, and
wherein a sum of allowable current values of all the small-diameter cables satisfies an allowable current value of the connection cable.

2. A robot comprising:
a first member and a second member that are supported in such a manner as to be relatively movable; and
the power harness according to claim 1,
wherein one end of the carrier is fixed to the first member, and another end of the carrier is fixed to the second member.

3. A power harness comprising:
a first connector connectable to a power supply;
a second connector connectable to a power connector provided at a single actuator; and
a connection cable that connects the first connector and the second connector to each other,
wherein a movable region constituted of a plurality of small-diameter cables arranged parallel to each other is provided at at least a part of a lengthwise section of the connection cable, and a region in which the small-diameter cables are bound together into a single cable is provided at another part of the lengthwise section, and
wherein a sum of allowable current values of all the small-diameter cables satisfies an allowable current value of the connection cable.

4. The power harness according to claim 3, further comprising:
- a carrier that surrounds at least a part of the movable region and that guides movement of the movable region,
- wherein an internal space of the carrier is divided into a plurality of small spaces through which the small-diameter cables extend in a lengthwise direction of the carrier.

5. The power harness according to claim 4,
- wherein the plurality of small spaces have identical sizes, and a number of the small spaces is larger than a number of the small-diameter cables.

6. A robot comprising:
- a first member and a second member that are supported in such a manner as to be relatively movable; and
- the power harness according to claim 4,
- wherein one end of the carrier is fixed to the first member, and another end of the carrier is fixed to the second member.

* * * * *